(12) United States Patent
Briand et al.

(10) Patent No.: US 8,536,250 B2
(45) Date of Patent: Sep. 17, 2013

(54) GEOPOLYMER AND EPOXY SIMULTANEOUS INTERPENETRATING POLYMER NETWORK COMPOSITION, AND METHODS FOR THE SAME

(75) Inventors: Remi Briand, Overland Park, KS (US); Laura J. Betzen, Lenexa, KS (US); Jeremy M. Ethington, Independence, MO (US); Erin McKenzie, Shawnee, KS (US); Peter A. Smith, Parkville, MO (US)

(73) Assignee: Tnemec Company Inc., North Kansas City, MO (US)

( * ) Notice: Subject to any disclaimer, the term of this patent is extended or adjusted under 35 U.S.C. 154(b) by 44 days.

(21) Appl. No.: 12/904,387

(22) Filed: Oct. 14, 2010

(65) Prior Publication Data

US 2012/0094028 A1  Apr. 19, 2012

(51) Int. Cl.
 *C08L 63/00* (2006.01)
 *C08K 3/34* (2006.01)
 *C08K 3/36* (2006.01)

(52) U.S. Cl.
 USPC ............ 523/402; 523/425; 523/457; 523/466

(58) Field of Classification Search
 USPC ................. 523/400, 401, 402, 425, 457, 458, 523/466
 See application file for complete search history.

(56) References Cited

U.S. PATENT DOCUMENTS

| 6,107,368 | A  | * | 8/2000 | Roland et al. ................. 523/401 |
| 6,534,568 | B1 |   | 3/2003 | Katz |
| 6,645,340 | B2 | * | 11/2003 | Gienau et al. ................. 156/330 |
| 2007/0104859 | A1 |   | 5/2007 | Featherby |
| 2007/0224362 | A1 |   | 9/2007 | Briand |
| 2010/0018750 | A1 |   | 1/2010 | Schaal |

FOREIGN PATENT DOCUMENTS

WO  WO2008113609  9/2008

OTHER PUBLICATIONS

M. Hussain et al, "Synthesis and Thermal Behavior of Inorganic-Organic Hybrid Geopolymer Composites", Journal of Applied Polymer Science, Apr. 5, 2005, vol. 96, No. 1, pp. 112-121.

\* cited by examiner

*Primary Examiner* — Michael J Feely
(74) *Attorney, Agent, or Firm* — Spencer Fane Britt & Browne LLP

(57) ABSTRACT

A simultaneous interpenetrating polymer network—geopolymer epoxy composition includes a first component comprised of a waterborne epoxy curing agent, an aluminosilicate source, and an amorphous silica, and a second component comprised of an epoxy resin and an alkaline silicate solution. The two components are mixed to produce a SIN-GE composition that cures at ambient temperatures. The SIN-GE composition may be a low-viscosity, sprayable composition, or may be a higher-viscosity composition. The compositions may be used as coatings, adhesives, mortars, casting materials, and the like.

31 Claims, 1 Drawing Sheet

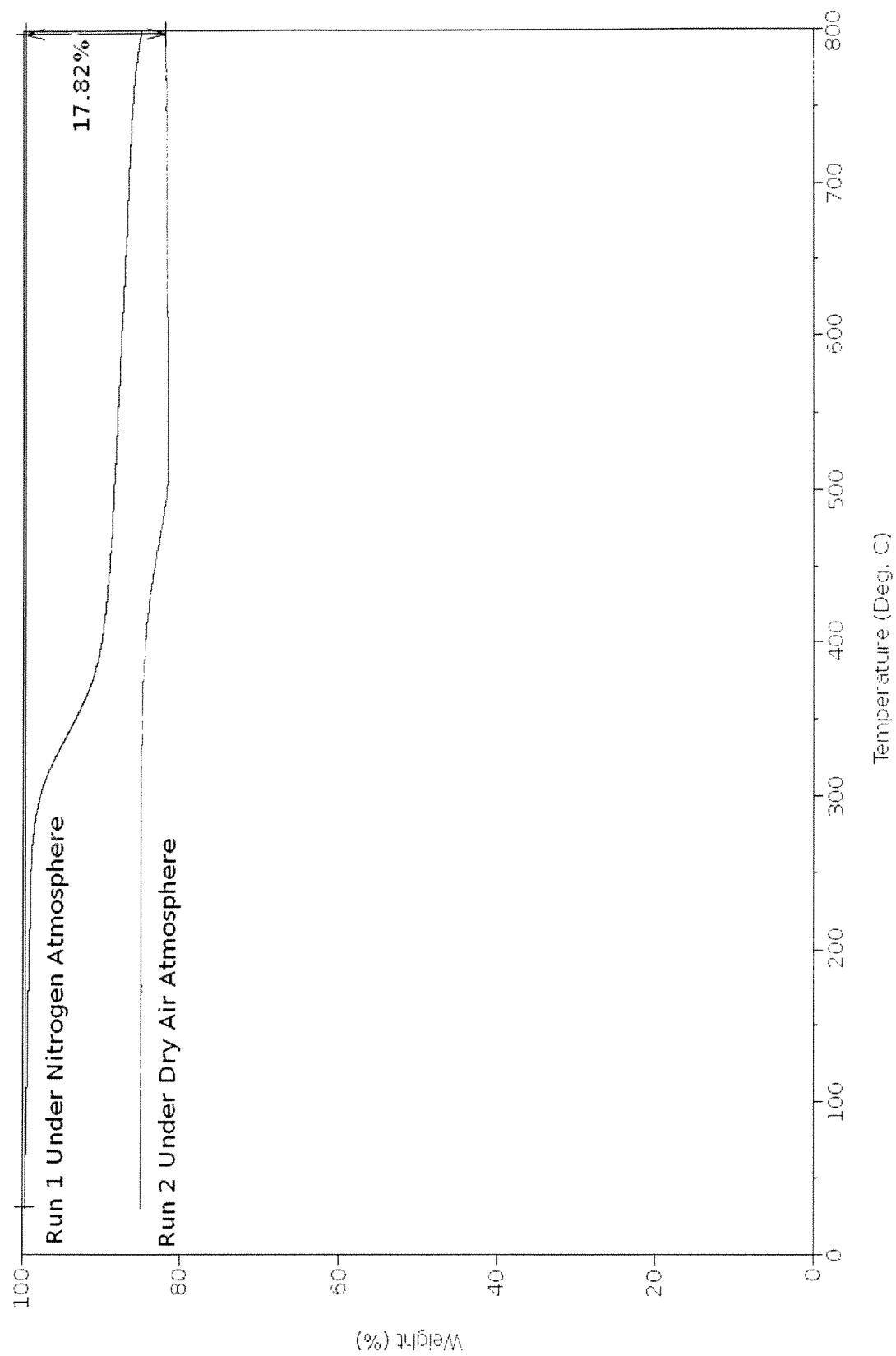

GEOPOLYMER AND EPOXY SIMULTANEOUS INTERPENETRATING POLYMER NETWORK COMPOSITION, AND METHODS FOR THE SAME

RELATED APPLICATIONS

Not Applicable

BACKGROUND OF THE INVENTION

1. Field of the Invention

The present invention relates to simultaneous interpenetrating polymer networks consisting of geopolymer and epoxy (hereafter referred to as SIN-GE), coatings utilizing SIN-GE compositions, and methods of making and applying compositions. A SIN is an interpenetrating polymer network obtained by the simultaneous crosslinking of two different polymer systems, without covalent bonds between the two networks [8].

2. Background

"Geopolymers" have been in use, under that name, since the 1970s, though the use of similar material occurred before that point. The term "geopolymer" refers to a class of aluminum silicate inorganic polymers. Geopolymer binders and cements are typically formed by reacting aluminum and silicon sources that contain $AlO_4^-$ and $SiO_4$ tetrahedral units under highly alkaline conditions at ambient temperatures. Metakaolin is a common aluminosilicate starting material in the formation of geopolymers, useful for manufacturing consistent geopolymers with predictable physical properties. Other aluminosilicate sources, such as Type F fly ash, have also been used.

Geopolymers typically have the following general formula [3]:

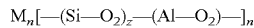

$$M_n[-(Si-O_2)_z-(Al-O_2)-]_n$$

Where M is a monovalent cation, z defines the ratio of Si to Al, and n is the degree of polymerization. M is typically an alkali metal such as lithium, sodium, potassium, cesium.

The ratio of Si to Al in a geopolymer defines the properties of a geopolymer and, therefore, also the possible applications of the geopolymer [6]. Geopolymers having a Si:Al ratio of 1:1 are known as poly(sialate) geopolymers. Those geopolymers having a Si:Al ratio of 2:1 are known as poly(sialate-siloxo) geopolymers. Those having a Si:Al ratio of 3:1 are known as poly(sialate-disiloxo) geopolymers. Typically, all of these types of geopolymers form three-dimensional networks that are very rigid. Higher ratios of Si:Al yield two-dimensional or even linear structures Geopolymers are typically formed by mixing waterglass with a metakaolin (calcined aluminosilicate) to form a paste. The waterglass typically includes highly-caustic compounds such as LiOH, NaOH, KOH, or CsOH in an appropriate amount of water into which amorphous silica is dissolved. Additional amorphous silica is often utilized, which may be in the form of dry particles and/or a liquid form, such as a dispersion. During the formation of the geopolymer, a three-part chemical reaction takes place: 1) dissolving the aluminosilicate and additional amorphous silica into the waterglass, 2) polycondensation or polymerization of $AlO_4^-$ and $SiO_4$ tetrahedra into a random network; and 3) precipitation into circular polysialates.

Geopolymers are suitable for use in a variety of applications, including in coatings, refractory adhesives, low-$CO_2$-producing cements, isochemical ceramics, and more. They are strong, light-weight, and quick setting, and are generally considered more "green" than other materials used in the art due to the lack of volatile organic compounds and the fact that geopolymers only release small amounts of $CO_2$ compared to Ordinary Portland Cement (OPC). The production of OPC follows the reaction below [1, 2]:

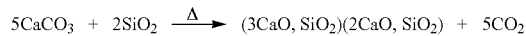

$$5CaCO_3 + 2SiO_2 \xrightarrow{\Delta} (3CaO, SiO_2)(2CaO, SiO_2) + 5CO_2$$

This reaction emits $CO_2$ in two ways: burning of the fossil fuel to provide the heat necessary for the reaction and as a direct reaction product. Whereas, the only $CO_2$ emitted in the production of geopolymers solely comes from the burning of fossil fuels to calcine the kaolin into metakaolin. Producing 1 ton of OPC generates 1 ton of $CO_2$, whereas, 1 ton of geopolymeric cement generates 0.180 tons of $CO_2$.

Coatings are used for a variety of protective and decorative functions. Coatings may, for example, be used for protection of vehicles, structures, or their component parts, from corrosion, chemical degradation, temperature, pressure, radiation, abrasion, and weathering elements such as ice, wind, and rain.

Organic coatings have also been used for the purposes described above. Production of such coatings, however, often requires the use of harmful or hazardous materials. Some of the materials are volatile and enter the atmosphere during the coating production process or afterward, when the coating is in use. These volatile components are essentially pollutants and the adverse impact of these components on the atmosphere and environment renders them undesirable. Further, production of organic coatings often entails the use of large volumes of petroleum products, thus rendering the environmental footprint of these coatings even larger than from the volatile components alone. Organic coatings also tend to degrade or be otherwise damaged by high-heat conditions. Many organic bonds begin to decompose at temperatures around 400° C. or lower. Some organic compounds begin to breakdown or outgas volatile components at an even lower temperature.

Epoxy polymers have been in use since the 1940s. For ambient cure applications, epoxy resins are crosslinked with a variety of curing agents. Traditional epoxy coatings are solvent borne, and more recently 80-100% solids by volume. In the last two decades, waterborne epoxy systems have been developed, which can reduce the volatile organic compound (VOC) content due to the use of water as an exempt solvent. Epoxy coatings are desirable because of their high hardness, toughness, corrosion resistance, and adhesion. Waterborne epoxies typically have high hardness, toughness, and adhesion, but their corrosion resistance and water resistance is not as good as solventborne or high solids epoxies, and they typically have lower volume solids. Waterborne epoxies also lose adhesion after long-term immersion in 140° F. deionized water. For these reasons, waterborne epoxies have not been successful in penetrating the industrial protective coatings market for severe environments, such as immersion service coatings, tank linings, or coastal marine applications.

Inorganic coatings have a number of advantages over organic coatings. Inorganic coatings tend to be less expensive than organic coatings because they can be made from abundant natural resources. Inorganic coatings are also generally more highly resistant to heat than organic coatings. Traditional inorganic coatings do suffer from disadvantages as well, however. For example, traditional cementitious inorganic coatings tend to be brittle and crack easily, do not exhibit the same degree of flexibility generally found in an organic coating, and tend to adhere poorly to organic or polymeric substrates.

Geopolymer coatings, which are inorganic, also suffer from some of the disadvantages described above. For example, geopolymer coatings may suffer from shrinkage and cracking at high water levels, which may result in loss of adhesion or premature corrosion. This limit on the amount of water that can be used with traditional geopolymer coatings also limits the properties of the resulting coating. Literature generally provides the following ideal molar ratios for geopolymer components: 1.00 $M_2O$; 1.00 $Al_2O_3$; 4.00 $SiO_2$; and 11.00 $H_2O$ [4]. When the molar ratio of water is increased from the value given here, geopolymer coatings tend to shrink, crack, or the like.

The combination of a geopolymer and latex in a coating has been found to prevent cracking in a 2008 patent [3]. This patent is for a geopolymer composition involving geopolymer-containing filler particles and film forming geopolymer precursors. Both in situ and premade geopolymers are contained in the composition. Latex could be added as a toughening agent to the composition.

Geopolymers have been described as a possible filler for a curable epoxy resin composition for use as an electrically insulating material [5]. In this instance, the geopolymer portion is not created in situ, but rather used as a premade filler.

It has been previously reported that geopolymer and epoxy hybrid compositions can be created in situ [6]. A separate geopolymer paste was prepared and added to a mixture of liquid epoxy resin and curing agent. This mixture was cured at 60° C. for 6 hours then post cured at 180° C. for 2 hours. It was determined that when geopolymer is incorporated into an epoxy system, the thermal stability is improved. There are five components used to make this composition, and three separate mixing steps. These five separate components must be mixed at the time of use. In the first step, the three components of the geopolymer paste are mixed in one container. In the second step, the liquid epoxy resin and curing agent are mixed in a second container. At this point, the mixtures made in step one and step two are not shelf stable, and therefore cannot be stored over time. In the third step, the previous two mixtures are blended together.

SUMMARY OF THE INVENTION

The present invention provides a simultaneous interpenetrating polymer network—geopolymer and epoxy (SIN-GE) composition including two components. The first component includes a waterborne epoxy curing agent, an aluminosilicate source, and an amorphous silica. The second component includes an epoxy resin and an alkaline silicate solution. When the first and second components are mixed, they form a SIN-GE composition that cures at ambient temperatures. In some embodiments of the present invention, the composition may be thinned with water and/or solvent to obtain the proper application viscosity.

In one embodiment of the present invention, the aluminosilicate source is metakaolin.

In another embodiment of the present invention, the SIN-GE composition contains up to about 70% water.

In another embodiment of the present invention, the SIN-GE composition retains 100% adhesion to a metal substrate after 2,424 hours of immersion in 140° F. deionized water.

In another embodiment of the present invention, the geopolymer imparts thermal resistance to the composition up to 800° C.

In another embodiment of the present invention, the SIN-GE composition further includes a component that is a filler, defoamer, pigment, toughening agent, hydrophobic agent, dispersant, plasticizer, catalyst, solvent, or a combination of these.

In still another embodiment of the present invention, the waterborne epoxy curing agent is present from about 0.2% to about 28% by weight.

In another embodiment of the present invention, the aluminosilicate source is present from about 0.1% to about 9% by weight.

In another embodiment of the present invention, the amorphous silica is present from about 0.5% to about 41% by weight.

In another embodiment of the present invention, the epoxy resin is present from about 0.3% to about 29% by weight.

In another embodiment of the present invention, the alkaline silicate solution is present from about 0.5% to about 23% by weight.

In another embodiment of the present invention, the geopolymer:epoxy weight ratio of the composition is about 10:90 to about 90:10.

In another embodiment of the present invention, the $M_2O$:$Al_2O_3$:$SiO_2$ molar ratio of the composition is about 0.5:0.5:3 to about 1.5:1.5:40.

The present invention also provides a simultaneous interpenetrating polymer network—geopolymer and epoxy (SIN-GE) composition including two components, where the first component includes from about 2% to about 24% by weight of a waterborne epoxy curing agent, from about 0.25% to about 6%, by weight of an aluminosilicate, and from about 1% to about 31% of an amorphous silica. The second component includes from about 2% to about 25% of an epoxy resin and from about 1% to about 17% of an alkaline silicate solution. When the first and second components are mixed, they form a SIN-GE composition that cures at ambient temperatures.

The present invention also provides the method for manufacturing the components of a SIN-GE composition as described above, and a method of applying a SIN-GE composition to a substrate Another embodiment of the present invention includes applying the SIN-GE to a substrate as a coating, mortar, adhesive, or casting material via spraying, brushing, rolling, troweling, pouring, dipping, casting, or injecting.

Another embodiment of the present invention further includes the capability of the SIN-GE composition to cure at ambient temperature.

Another embodiment of the present invention provides a composition including from about 0.5% to about 10% by weight of fibers to produce an adhesive composition. The fibers may be organic or inorganic fibers, such as, for example, polyolefin fibers, carbon fibers, wollastonite, fiberglass, and combinations thereof.

Another embodiment of the present invention provides a composition to which from about 100% to 250% by weight of sand is added to produce a mortar composition.

Another embodiment of the present invention provides a composition to which sand and fiber are added, totaling from about 100% to about 250% by weight to produce a mortar composition.

Another embodiment of the present invention provides a composition having amorphous silica as a dispersion wherein the amorphous silica particle size is from about 5 nanometers to about 2,000 microns, and preferably about 12 nanometers.

BRIEF DESCRIPTION OF THE DRAWINGS

FIG. 1 is a plot showing a thermal gravimetric analysis (TGA) of one embodiment of a composition according to the present invention. This figure provides evidence that the present invention has excellent thermal resistance up to 800° C.

DETAILED DESCRIPTION OF THE PREFERRED EMBODIMENTS

The present invention relates to a composition consisting of two components that react to form a simultaneous interpenetrating polymer network—geopolymer epoxy (SIN-GE) composition when mixed together. A simultaneous interpenetrating polymer network is formed by polymerizing two different monomer and crosslinking agent pairs in one step [8]. A first component of the present composition includes a waterborne epoxy curing agent, an aluminosilicate, and amorphous silica. A second component includes an epoxy resin and an alkaline silicate solution. When combined the first and second components produce in situ SIN-GE. Prior to mixing the two components, no geopolymer or crosslinked epoxy is present.

In some embodiments of the present invention, metakaolin is used as the aluminosilicate source. Metakaolin is a dehydroxylated form of kaolin, and methods of producing metakaolin are known in the art. It is contemplated that any suitable aluminosilicate source may be used in conjunction with the present invention. Exemplary aluminosilicate sources are described below.

The SIN-GE compositions of the present invention offer several advantages over other compositions commonly used in the art. The present compositions can be made with little to no volatile organic solvents and therefore minimize the negative environmental impact associated with the emission of VOCs. When the compositions utilize VOCs, the strictest VOC regulations can still be met. Water is used in some embodiments in the preparation of the present compositions and may be present up to 72% by weight of the composition, depending on the desired properties of the final composition.

Further, the present compositions are able to withstand elevated temperatures without significant degradation. FIG. 1 shows the thermal gravimetric analysis (TGA) plot of an exemplary SIN-GE composition that has greater than 80% weight retention up to 800° C. This result demonstrates that the present composition has unexpectedly better heat resistance than prior art compositions.

Compared to conventional waterborne epoxies, the present compositions exhibit improved humidity and deionized water immersion resistance. After 2,424 hours of ASTM D 4585 humidity exposure, the SIN-GE composition exhibits no rusting, blistering, delamination, or other film defects. The SIN-GE composition retains 100% adhesion after 2,424 hours of immersion in 140° F. deionized water, which is rated as a 5B according to ASTM D 3359.

Further, the epoxy component of the present compositions allows high amounts of water to be used in the compositions without rendering them susceptible to shrinkage and cracking. This was a considerable limitation of previous geopolymer compositions, and the fact that this problem has been solved with the present invention will allow for geopolymer compositions whose physical properties and characteristics can be modified by addition of high amounts of water to the composition.

The amorphous silica portion of the present invention preferably includes a silica dispersion. It is preferred that the silica dispersion is an aqueous dispersion, though it is contemplated that the silica may be provided in any other suitable dispersion medium. Silica particles used in the dispersion may vary in range from about 5 nm to about 2,000 microns. Exemplary silica particles suitable for use in the present compositions are around 12 nm in size.

The present SIN-GE compositions also preferably include other materials in addition to those mentioned above. A variety of extenders may be used in order to influence the physical properties of the final composition. These extenders include zinc compounds, barium compounds, sulfate compounds, strontium compounds, calcium compounds, iron compounds, graphite, silica compounds, silicate compounds, titanium compounds, geopolymer particles, organic polymer fibers, and inorganic fibers. Various inorganic or organic color pigments may also be included as dry pigments or as pre-dispersed pigments. The first component of the present SIN-GE composition preferably also includes a defoamer.

The present SIN-GE compositions may be applied to a substrate in any suitable manner: the word "substrate" is used broadly herein to refer to any surface onto which the present compositions may be applied. Some embodiments of the present compositions are suitable for application to a substrate by spraying. Other higher viscosity embodiments may be applied to a substrate in other ways. The present compositions may be used as coatings, mortars, adhesives, or as casting materials. Individual materials of the present compositions, including water, can be varied in terms of percent by weight in order to produce a final composition suitable for a desired end-use.

Exemplary SIN-GE Compositions

The precise quantities and relative quantities of each of the materials of the present composition may vary according to the desired physical properties of the final composition. Preferred values, provided as percent by weight, are given below, both with respect to compositions that include high levels of extenders and those with low levels of extenders.

TABLE 1

Preferred Material Ranges

|  | Wt. % with High Extender Loading | Wt. % with Low Extender Loading |
|---|---|---|
| First Component: | | |
| Waterborne Epoxy Curing Agent | 0.2-8% | 1-28% |
| Deionized Water | 3-6% | 12-20% |
| Defoamer | 0.07-0.1% | 0.1-1% |
| Aluminosilicate | 0.1-3% | 0.5-9% |
| Amorphous Silica | 0.5-13% | 5-41% |
| Second Component: | | |
| Epoxy Resin | 0.3-8% | 1-29% |
| Deionized Water | 0.01-1% | 0.2-1% |
| Sodium Silicate or Potassium Silicate Solution | 0.5-8% | 2-23% |
| Extenders/Pigments | 71-82% | 10-17% |
| Geopolymer:Epoxy Weight Ratio | 10-90:90-10 | |
| $M_2O:Al_2O_3:SiO_2$ Molar Ratio | 0.5-1.5:0.5-1.5:3-40 | |

Table 1, above, provides preferred ranges for the various materials of the present coating composition. For each range disclosed, it is contemplated that each point within the disclosed range is a viable percent weight for the material associated with that range, and that the disclosure of the ranges in Table 1 constitutes disclosure of the individual points falling within the ranges.

Also, with respect to the formulations provided above, metakaolin is used as an aluminosilicate source. It is contemplated, however, that any suitable aluminosilicate may be used with respect to any of the various compositions disclosed herein, so long as the aluminosilicate is suitable for the preparation of a geopolymer. Exemplary aluminosilicates include metakaolin, fly ash, coal gangue, zeolite, silica fume, and combinations of these. In one embodiment, aluminosilicate is metakaolin, as it can provide a consistent geopolymer product with predictable physical properties. While Type F fly ash is often used in the art to produce geopolymers, it is less desirable due to impurities, such as calcium and iron, in the fly ash. These impurities can add chemical reaction pathways during the geopolymerization process and can result in substantial changes in the final product, including changes to setting times, slump, strength, and shrinkage.

Sodium silicate or potassium silicate is provided as the alkaline silicate solutions in Table 1, above. In addition to sodium silicate and potassium silicate, for example, lithium silicate or cesium silicate may be used.

The term "defoamer" is used generally in Table 1, as well as in Tables 2 and 3, below. Any suitable defoamer or anti-foaming agent known in the art may be used with the present coatings.

In each of the above instances wherein a suitable material other than that provided in Table 1 is used, it is contemplated that one of skill in the art will be able to readily ascertain the appropriate amount of the material to use based on Table 1, above, and the percents by weight of other materials used.

Table 2, below, provides another exemplary range distribution for use in producing a composition of the present invention. The values provided in Table 2 are an alternate embodiment to those provided in Table 1. As with Table 1, above, the specific materials listed in Table 2 may be replaced with other suitable materials. Further, the ranges set forth in Table 2 are meant to encompass each individual point within each range.

TABLE 2

More Preferred Material Ranges

|  | Wt. % with High Extender Loading | Wt. % with Low Extender Loading |
|---|---|---|
| First Component: |  |  |
| Waterborne Epoxy Curing Agent | 2-7% | 8-24% |
| Deionized Water | 3-6% | 10-22% |
| Defoamer | 0.01-0.2% | 0.2-1% |
| Aluminosilicate | 0.25-2% | 1-6% |
| Amorphous Silica | 1-9% | 10-31% |
| Second Component: |  |  |
| Epoxy Resin | 2-7% | 9-25% |
| Deionized Water | 0.01-1% | 0.2-2% |
| Sodium Silicate or Potassium Silicate Solution | 1-6% | 5-17% |
| Extenders/Pigments | 73-80% | 10-31% |
| Geopolymer:Epoxy Weight Ratio | 20-60:80-40 | |
| $M_2O:Al_2O_3:SiO_2$ Molar Ratio | 0.8-1.2:0.8-1.2:4-30 | |

Table 3, below, provides another alternate embodiment of percentages by weight of the various materials that make up the first and second components of the present coating composition. The materials listed in Table 3 may be replaced with any other suitable material.

TABLE 3

Most Preferred Material Percents by Weight

|  | Wt. % with High Extender Loading | Wt. % with Low Extender Loading |
|---|---|---|
| First Component: |  |  |
| Waterborne Epoxy Curing Agent | 52.6% | 20.65% |
| Deionized Water | 4.35% | 17.09% |
| Defoamer | 0.09% | 0.35% |
| Aluminosilicate | 0.69% | 2.70% |
| Amorphous Silica | 3.58% | 14.06% |
| Second Component: |  |  |
| Epoxy Resin | 5.60% | 22.01% |
| Deionized Water | 0.17% | 0.66% |
| Sodium Silicate or Potassium Silicate Solution | 1.95% | 7.64% |
| Extenders/Pigments | 78.31% | 14.84% |
| Geopolymer:Epoxy Weight Ratio | 25:75 | |
| $M_2O:Al_2O_3:SiO_2$ Molar Ratio | 1:1:14.7 | |

Method of Making the Present Composition

In general, the present composition is made by preparing the first and second components, as set forth in the tables above, mixing in the order the materials are presented in the table. The second component is then added to the first component and stirred. Water may be added to achieve proper viscosity, depending on the desired application. The resulting composition may be applied via spray, brush, roll, dip, casting, or other suitable methods. Any method to apply inorganic or organic compositions may also be used. During the cure of the composition, both the epoxy and the geopolymer are polymerized in situ. The extender portion of the above embodiments may be included in one or both of the two components and/or added as a third component.

The present composition may be provided in a variety of viscosity ranges, depending on the specific formulation used, and the end use for the composition. A clear formulation, thinned for conventional suction spray, preferably has a viscosity of 20 to 30 seconds as measured in a Zahn EZ cup. Using the same method of viscosity measurement, a zinc-rich formulation thinned for conventional suction spray preferably has a viscosity in the same 20 to 30 second range. A white formulation may have a viscosity of about 60 Krebs units (KU) to about 130 KU, depending on the intended method of application. A mortar formulation of the present invention preferably has a viscosity similar to any Portland cement-based mortar, and allows for easy trowelability. An adhesive formulation of the present composition preferably has a viscosity of about 60 KU to about 140 KU.

In addition to viscosity, the present compositions have a dry film thickness (DFT) that may vary depending on the specific formulation used and the intended end use of the composition. For example, a clear composition preferably has a DFT of about 2 to 80 mils. A zinc rich composition preferably has a DFT of about 1.5 to 10 mils. A white composition preferably has a DFT of about 2 to 80 mils, similar to the clear composition, while a mortar composition preferably has a thickness of up to ¼ inch or more. An adhesive composition preferably has a thickness of about 2 to 50 mils An insulation composition or intumescent composition each preferably has a thickness of about 2 to 250 mils.

Additional Compositions

As noted above, compositions of the present invention may be used for adhesive and mortar applications. Compositions used for such applications may differ from those exemplary compositions discussed above in terms of their composition.

An adhesive composition of the present invention preferably includes fibers from about 0.5% to about 10% by weight. Fibers used in such compositions of the present invention may include organic fibers, inorganic fibers, or combinations of the two. Exemplary fibers include polyolefin fibers, cellulose fibers, carbon fiber, wollastonite, fiberglass, and the like. Any fibers suitable for use in an adhesive composition may be used in the adhesive compositions of the present invention, and it is contemplated that such fibers will be readily ascertainable by one of ordinary skill in the art upon reading this disclosure. An exemplary adhesive composition can be prepared, for example, by utilizing the component percentages for a low extender loading composition given in Table 3, above, and adding about 10% by weight of fibers.

A mortar composition of the present invention preferably includes additional sand, fibers, or combinations thereof, added from about 100% to about 250% by weight. For example, a mortar composition of the present invention may include 100% to 250% by weight of sand, 100% to 250% by weight of fiber, or a combination of sand and fiber totaling 100% to 250% by weight. The fibers suitable for use in a mortar composition may be inorganic or organic fibers, such as those discussed with respect to adhesive compositions above. An exemplary mortar composition can be prepared, for example, by utilizing the material percentages for a low extender loading composition given in Table 3, above, and adding about 250% by weight of sand, fiber, or a combination of sand and fiber.

Additional Materials

In addition to the materials described above, for example in Tables 1, 2, and 3, the compositions of the present invention may include additional materials depending on the intended use of a given composition. These additional materials are generally present in small amounts and will not substantially affect the percentages by weight of the other materials. In the event that the percentages by weight of the other materials have to be modified due to the inclusion of an additional material, it is contemplated that such modification is within the ability of one of ordinary skill in the art who has read this disclosure.

For example, a clear composition of the present invention may form white spots when used for certain applications (e.g. spraying the composition onto panels). These spots may become a focal point for corrosion and the like. It has been determined, however, that the inclusion of a dispersant in the formulation prevents the occurrence of the white spots. The dispersant is preferably a copolymer dispersant with pigment affinic groups.

The compositions of the present invention may include one or more fillers as necessary or desirable according to the intended use of the composition. The specific types of fillers, their forms, and the amounts used will also depend on the intended use of the coating. Exemplary fillers include: inorganic fillers such as quartz, talc, mica, wollastonite, diatomaceous earth, zeolites, kaolin, sepiolite, bentonite, dolomite, various aluminosilicates, barium sulfate, strontium sulfate, calcium carbonate, zinc dust, zinc flake, zinc oxide, zinc phosphate, modified zinc phosphate, modified zinc oxide, iron oxide, crystalline silica, fumed silica, iron phosphide, garamite, montmorillonite, ceramic, glass, elemental iron, nepheline syenite, calcium silicate, graphite, aluminum flake, feldspar, cristobalite, carbon fibers, granite, silica aerogel, geopolymer, basaltic fibers, inorganic fibers; and organic fillers such as cellulosic materials, polymeric hollow beads, polymeric fibers (polypropylene, Kevlar, for example) and the like.

Pigments, dyes, and colorants may also be included such as: zinc oxide, iron oxide, chromium oxide, phthalocyanine blue, phthalocyanine green, organic pigments, carbon black, lamp black, mixed metal oxides or pre-dispersed forms of these.

Toughening agents may be used to alter the physical properties of the present compositions [3]. For example, ethylene/vinyl laurate/vinyl chloride terpolymers may be used as toughening agents. By adding an increasing amount of toughening agent to the present compositions, one can cause the compositions to have physical properties more similar to an organic coating, whereas reducing the amount of toughening agent utilized can cause the resultant coating to have physical properties more similar to an inorganic coating.

Hydrophobic agents can be used to impart more hydrophobic properties to the compositions of the present invention. As an example, a polyethylene wax or a powder form of silane provided on a carrier matrix is suitable for use as a hydrophobic agent with the present compositions.

Dispersants may also be used to aid in the dispersal of the materials of the present compositions. The type of dispersant used depends on the various materials used in any composition. The amount of dispersant used will depend on the specific type of dispersant utilized, as well as the various other materials of any given composition.

Plasticizers may also be used in conjunction with the present compositions. Examples of suitable plasticizers are benzyl alcohol and polymerized melamine sulfonate.

Catalysts may also be used to alter the curing rate of the present compositions. Examples of suitable catalysts for the epoxy/curing agent reaction include: tertiary amines such as Ancamine K54, Ancamine 1110, Ancamine K61B, or Amicure DBU-E; acrylates such as trimethylolpropane triacrylate (TMPTA) or hexanediol diacrylate (HDODA); and acids such as salicylic acid or para-toluenesulfonic acid (PTSA). Examples of suitable catalysts for the geopolymer reaction include: organotin catalysts such as dibutyl tin dilaurate (DBTDL) or Cotin 280; tetrabutylammonium fluoride (TBAF); or any Lewis acid or Lewis base. Any other suitable catalyst for epoxy-curing agent reactions and/or geopolymer reactions may also be used.

Solvents may also be used. The type and amount of solvent used depends on the various materials used in any composition and may be chosen by one of ordinary skill in the art.

In addition to the above, other modifications to the present compositions, substitution of components, and the like, will be readily apparent to one of ordinary skill in the art upon reading this disclosure. Such modifications, substitutions, and the like are contemplated to be within the spirit and scope of the present invention.

Having thus described the preferred embodiments of the invention, what is claimed as new and desired to be protected by Letters Patent includes the claims below.

REFERENCES CITED

1. Davidovits, J. "Geopolymers: Inorganic Polymeric New Materials." *J. Therm. Anal.*, 37, 1633-56 (1991).
2. Davidovits, J. "Environmentally Driven Geopolymer Cement Applications." *Geopolymer* 2002 *Conference* (Oct. 28-29, 2002).
3. Xuhong, T.; Jinghua, Y. World Intellectual Property Organization. International Patent Application. WO 2008/113609 A2.
4. Bell, J.; Kriven, W. "Preparation of Ceramic Foams from Metakaolin-Based Geopolymer Gels." *Developments in*

Strategic Materials: Ceramic Engineering and Science Proceedings, 29, Issue 10, 97-111 (2008).
5. Schaal, S., et al. US Patent 2010/0018750 A1.
6. Hussain, M., et al. "Synthesis and Thermal Behavior of Inorganic-Organic Hybrid Geopolymer Composites." *J. of Applied Polymer Science*, 96, 112-121 (2005).
7. Sagoe-Crentsil, K. "Properties and Performance of Si-Rich Geopolymer Binder Systems." *Mechanical Properties and Performance of Engineering Ceramics and Composites IV: Ceramic Engineering and Science Proceedings*, 30, Issue 2 (2009).
8. Odian, G. *Principles of Polymerization: Third Edition*, 150 (1991).

The invention claimed is:

1. A geopolymer epoxy composition comprising:
   a) a first component comprising a waterborne epoxy curing agent, an aluminosilicate source, and an amorphous silica; and
   b) a second component comprising an epoxy resin and an alkaline silicate solution, wherein, when mixed together, said first and second components form a simultaneous interpenetrating polymer network geopolymer epoxy (SIN-GE) composition that cures at ambient temperature.

2. The composition according to claim 1, further comprising water, wherein said water is added to the SIN-GE composition to achieve a desired application viscosity.

3. The composition according to claim 2, comprising up to 72% by weight of water, based on said SIN-GE composition.

4. The composition according to claim 1, wherein the aluminosilicate source is metakaolin.

5. The composition according to claim 1, wherein the SIN-GE composition retains adhesion to a metal substrate after immersion in 140° F. deionized water.

6. The composition according to claim 1, wherein the SIN-GE composition has greater than about 80% weight retention up to 800° C.

7. The composition according to claim 1, wherein the SIN-GE composition further comprises a material selected from the group consisting of fillers, defoamers, pigments, toughening agents, hydrophobic agents, dispersants, plasticizers, catalysts, solvents, and combinations thereof.

8. The composition according to claim 1, wherein the first component waterborne epoxy curing agent is present in the SIN-GE composition at a percent by weight from about 0.2% to about 28%.

9. The composition according to claim 1, wherein the first component aluminosilicate source is present in the SIN-GE composition at a percent by weight from about 0.1% to about 9%.

10. The composition according to claim 1, wherein the first component amorphous silica is present in the SIN-GE composition at a percent by weight from about 0.5% to about 41%.

11. The composition according to claim 10, wherein the first component amorphous silica is present at a percent by weight from about 1% to about 31%.

12. The composition according to claim 10, wherein the first component amorphous silica is present at a percent by weight from 3.58% to 14.06%.

13. The composition according to claim 1, wherein the second component epoxy resin is present in the SIN-GE composition at a percent by weight from about 0.3% to about 29%.

14. The composition according to claim 1, wherein the second component alkaline silicate solution is present in the SIN-GE composition at a percent by weight of from about 0.5% to about 23%.

15. The composition according to claim 1, wherein the SIN-GE composition has a first component:second component weight ratio from about 10:90 to about 90:10.

16. The composition according to claim 1, wherein the first component composition further comprises $M_2O$, and the first component composition has a $M_2O:Al_2O_3:SiO_2$ molar ratio from about 0.5:0.5:3 to about 1.5:1.5:40; wherein M is a monovalent cation.

17. The composition according to claim 1 wherein said amorphous silica is an amorphous silica dispersion having a particle size of from about 5 nanometers to about 2,000 microns.

18. The composition according to claim 17 wherein the amorphous silica dispersion has a particle size of about 12 nanometers.

19. A simultaneous interpenetrating polymer network geopolymer epoxy (SIN-GE) composition, comprising:
   a) a first component comprising a waterborne epoxy curing agent, an aluminosilicate source, and an amorphous silica;
   b) a second component comprising an epoxy resin, and an alkaline silicate solution;
   c) wherein the SIN-GE composition comprises from about 2% to about 24% by weight of the waterborne epoxy curing agent, from about 0.25% to about 6% by weight of the aluminosilicate source, from about 1% to about 31% by weight of the amorphous silica; from about 2% to about 25% by weight of the epoxy resin, and from about 1% to about 17% by weight of the alkaline silicate solution; and
   d) wherein, when mixed together, the SIN-GE composition cures at ambient temperature.

20. The composition according to claim 19, further comprising water, wherein said water is added to the SIN-GE composition to achieve a desired application viscosity.

21. The composition according to claim 19, further comprising fibers, wherein said fibers are added to the SIN-GE composition from about 0.5% to about 10% by weight.

22. The composition according to claim 21, wherein the fibers are selected from the group consisting of polyolefin fibers, cellulose fibers, carbon fibers, wollastonite, fiberglass, and combinations thereof.

23. The composition according to claim 19, further comprising sand, wherein said sand is added to the SIN-GE composition from about 100% to about 250% by weight.

24. The composition according to claim 23, further comprising fibers, wherein the combination of sand and fibers is added to the SIN-GE composition at a total weight percent from about 100% to about 250%.

25. The composition according to claim 19, further comprising fibers, wherein said fibers are added to the SIN-GE composition from about 100% to about 250% by weight.

26. A simultaneous interpenetrating polymer network geopolymer epoxy (SIN-GE) composition, comprising:
   a) a first component comprising a waterborne epoxy curing agent, an aluminosilicate source, and an amorphous silica;
   b) a second component comprising an epoxy resin, and an alkaline silicate solution;
   c) wherein the SIN-GE composition comprises 5.26% by weight of the waterborne epoxy curing agent, 0.69% by weight of the aluminosilicate source, 3.58% by weight of the amorphous silica; 5.60% by weight of the epoxy resin, and 1.95% by weight of the alkaline silicate solution; and d) wherein, when mixed together, the SIN-GE composition cures at ambient temperature.

27. The composition according to claim 26, wherein the SIN-GE composition has a first component:second component weight ratio of 25:75.

28. The composition according to claim 26, wherein the first component composition further comprises $M_2O$, and the first component composition has a $M_2O:Al_2O_3:SiO_2$ molar ratio of about 1:1:14.7; wherein M is a monovalent cation.

29. A simultaneous interpenetrating polymer network geopolymer epoxy (SIN-GE) composition comprising:

a) a first component comprising a waterborne epoxy curing agent, an aluminosilicate source, and an amorphous silica;

b) a second component comprising an epoxy resin, and an alkaline silicate solution;

c) wherein the SIN-GE composition comprises 20.65% by weight of the waterborne epoxy curing agent, 2.70% by weight of the aluminosilicate source, 14.06% by weight of the amorphous silica; 22.01% by weight of the epoxy resin, and 7.64% by weight of the alkaline silicate solution; and d) wherein, when mixed together, the SIN-GE composition cures at ambient temperature.

30. The composition according to claim 29, wherein the SIN-GE composition has a first component:second component weight ratio of 25:75.

31. The composition according to claim 29, wherein the first component composition further comprises $M_2O$, and the first component composition has a $M_2O:Al_2O_3:SiO_2$ molar ratio of about 1:1:14.7; wherein M is a monovalent cation.

* * * * *